May 14, 1957     B. WASKO     2,791,911

BEAD CHAIN DRIVE

Filed April 20, 1956

INVENTOR
BERNARD WASKO
BY
HIS ATTORNEYS

United States Patent Office 2,791,911
Patented May 14, 1957

2,791,911

BEAD CHAIN DRIVE

Bernard Wasko, Eastchester, N. Y., assignor to Voland and Sons, Inc., New Rochelle, N. Y., a corporation of New York Application April 20, 1956, Serial No. 579,565

6 Claims. (Cl. 74—243)

This invention relates to improvements in mechanical movements and power transmitting mechanism and it relates particularly to an improved form of sprocket for use with bead chain transmissions and the like.

The sprockets heretofore provided for use with bead chain transmissions, are characterized by the provision of a disc-like or wheel-like element having a hub and a rim in which a plurality of generally radially disposed sockets are formed in order to receive the beads of the bead chain. Inasmuch as the sockets are formed in the periphery or outer surface of the rim of the sprocket, it is customary either to cast the sprocket or machine the sprocket from a blank and then machine or otherwise form the sockets in its periphery. Casting techniques are not suitable because the molds could not be stripped readily from the cast sprockets if the mold were provided with means for forming the bead receiving sockets therein unless the mold were of a complex and expensive construction.

The present invention relates to an improved type of sprocket for bead chain drives and the like in which the bead receiving sockets are formed and arranged so that the sprockets can easily be formed by a casting operation with a simple two part split mold. More particularly, the new sprocket is provided with bead-receiving recesses which are formed as grooves extending inwardly from opposite sides of the rim in alternate relation and extending partially across the rim to position their end portions in alignment around the periphery of the sprocket in proper relation to receive the beads of the chain in alignment. By suitably forming the surface of the rim with a slight taper, the sprocket can be cast in a two part mold which is split along substantially the center line of the rim of the sprocket and thereby can be separated readily to free the sprocket therefrom.

The cross-sectional shape of the grooves may take any of several different forms (i. e., semi-cylindrical, V-shaped or the like) depending upon requirements and the size of the sprocket. Inasmuch as the sprockets normally are not subjected to high stresses when used with a bead chain, they may be readily formed of plastic or a metal of good casting properties thereby greatly facilitating the manufacture of the sprockets at a relatively low cost.

For a better understanding of the present invention, reference may be had to the accompanying drawings in which.

Figure 1:
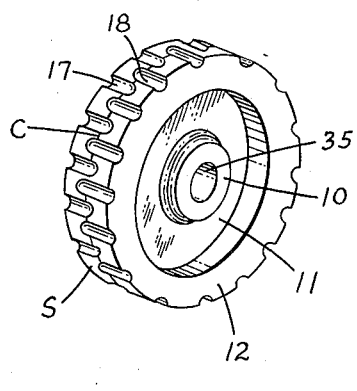
Figure 1 is a perspective view of a typical sprocket embodying the present invention.
Figure 2:
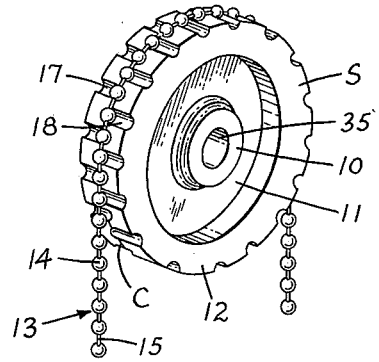
Figure 2 is a perspective view of the sprocket with a section of bead chain extending around it.

In accordance with the invention, the sprockets may be made of almost any desired material and of any suitable size for cooperation with a bead chain. As illustrated, a typical sprocket may include a hub 10 having a disk-like portion 11 terminating in a rim 12 having recesses therein to receive a conventional bead chain 13 formed of a series of small beads 14 connected by wire links 15. The novel feature of the sprocket is the arrangement of the recesses in the rim 12 to receive the beads of the sprocket. In accordance with this invention, the recesses consist of a series of grooves 17 and 18 extending partially across the periphery of the rim 12 alternately from opposite sides thereof. The grooves illustrated in Figure 1 are of semi-circular cross-section and they extend from one edge of the rim to the opposite side of the center line C of the rim 12 so that the inner end portions of the grooves 17 and 18 are in alignment to receive the beads 14 of the chain. When the grooves 17 and 18 are semi-circular in cross-section, the inner ends of the grooves should be semi-spherical in order to engage the beads 14 snugly and prevent lateral movement of the chain relative to the rim.

The grooves 17 and 18 may be of V-shaped cross-section instead of semi-circular and their inner ends may be semi-conical in smaller pulleys. The dimensions and spacing of the grooves may be accurately predetermined to assure smooth and precise operation of systems including bead chains and the new sprockets as described more particularly in my co-pending application Serial No. 579,564, filed on even date.

Figure 3:
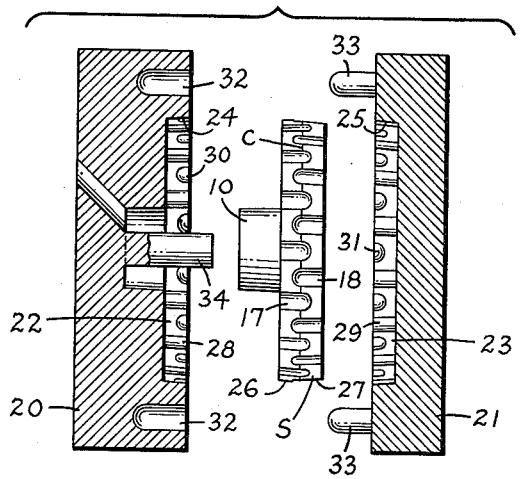
Figure 3 is an exploded view partly in front elevation and partly in vertical section through a mold and a sprocket therein.

The above-described type of sprocket can be molded easily in a simple two part mold as disclosed more particularly in Figure 3. Thus, a typical sprocket S may be cast between the mold sections 20 and 21 which have complemental mold cavities 22 and 23 therein conforming to the left and right hand sides of the sprocket to be formed. The mold cavities 22 and 23 have slightly tapered side walls 24 and 25, which form slightly tapered surfaces 26 and 27, on the opposite sides of the center line C of the rim of the sprocket in order to facilitate easy removal of the sprocket frame. Raised ribs 28 and 29, and small semi-spherical protuberances 30 and 31 which form the ends of the grooves 17 and 18 are formed on the side walls 24 and 25 of the cavities for receiving the beads of the chain. Each protuberance 31 on the mold 23 is in alignment with a rib 28 in the mold cavity 22 and each protuberance 30 is in alignment with a rib 29 in the mold cavity 23. Alignment of the ribs and protuberances is assured by means of dowels 32 and complemental cavities 33 on the mold sections. It will be understood that one of the mold sections will be provided with a sprue opening and one of them may also have a core rod 34 for forming the bore 35 through the hub 10 of the sprocket. When the grooves in the periphery of the sprocket are of triangular cross-section and their ends semi-conical, it will be understood that the ribs 28 and 29 and the protuberances 30 and 31 will be V-shaped and semi-conical, respectively.

The size of the sprockets can be varied depending upon requirements and the circular, V-shaped or other forms of grooves can be used in them. It will be understood, therefore, that the form of sprocket described herein is illustrative of the invention and should not be considered as limiting the scope of the following claims.

I claim:

1. A sprocket for bead chains and the like comprising a member having a substantially circular peripheral surface, said surface having grooves therein extending alternately from opposite sides of said surface in substantially parallel relation, said grooves extending only partially across said surface and having their inner ends in overlapping spaced relation at the mid-portion of said surface to enable said beads to engage in the inner ends of said grooves.

2. A sprocket as set forth in claim 1 in which the grooves have concavely curved bottoms and the inner ends thereof are semi-spherical to fit said beads.

3. A sprocket for bead chains and the like comprising a member having a peripheral rim portion tapering inwardly from its center line to its opposite lateral edges, said rim portion having substantially parallel grooves extending alternately from its opposite lateral edges partially across said rim, said grooves being spaced apart substantially equiangularly and having their inner ends in overlapping relation to the center line of said rim to receive the beads of a bead chain in alignment.

4. A sprocket as set forth in claim 3 in which the grooves have concavely curved bottoms and the inner ends thereof are semi-spherical to fit said beads.

5. A cast sprocket for bead chains and the like comprising a member having a hub and a circular rim portion, said rim portion having a slight taper from about its center line to its lateral edges to enable it to be freed from a mold, said rim portion having grooves extending alternately from the opposite lateral edges partially across it in parallel substantially uniformly spaced relation, said grooves having their inner ends disposed in overlapping relation and alternately on opposite sides of said centerline of said rim portion to form circumferentially aligned recesses to receive the beads of a bead chain.

6. A sprocket as set forth in claim 5 in which the grooves have concavely curved bottoms and the inner ends thereof are semi-spherical to fit said beads.

References Cited in the file of this patent

UNITED STATES PATENTS

| | | |
|---|---|---|
| 422,955 | Lorimer | Mar. 11, 1890 |
| 1,327,925 | Schneider | Jan. 13, 1920 |